(12) United States Patent
Lee

(10) Patent No.: US 11,240,970 B2
(45) Date of Patent: Feb. 8, 2022

(54) PLANT LIGHT RAISING AND LOWERING APPARATUS

(71) Applicant: Win Chen Electrical Co., Ltd., Taoyuan (TW)

(72) Inventor: Wu-Chang Lee, Taoyuan (TW)

(73) Assignee: Win Chen Electrical Co., Ltd., Taoyuan (TW)

( * ) Notice: Subject to any disclaimer, the term of this patent is extended or adjusted under 35 U.S.C. 154(b) by 357 days.

(21) Appl. No.: 16/660,884

(22) Filed: Oct. 23, 2019

(65) Prior Publication Data

US 2020/0375118 A1 Dec. 3, 2020

(30) Foreign Application Priority Data

May 31, 2019 (TW) ................................ 108118985

(51) Int. Cl.
| | |
|---|---|
| A01G 7/04 | (2006.01) |
| F21V 21/15 | (2006.01) |
| F21V 21/22 | (2006.01) |
| H05B 47/00 | (2020.01) |
| A01G 9/24 | (2006.01) |
| F21Y 115/10 | (2016.01) |

(52) U.S. Cl.
CPC ............ *A01G 7/045* (2013.01); *A01G 9/249* (2019.05); *F21V 21/15* (2013.01); *F21V 21/22* (2013.01); *H05B 47/00* (2020.01); *F21Y 2115/10* (2016.08)

(58) Field of Classification Search
CPC ...... A01G 7/045; A01G 9/249; A01G 25/097; A01G 25/095; F21V 21/15; F21V 21/22; F21V 19/0045; F21V 19/04; F21V 23/006; H05B 47/00; F21Y 2115/10; F21Y 2107/60; F21Y 2103/10; F21K 9/20; F21K 9/00; H05K 1/142; H05K 2201/042; H05K 2201/10106; H05K 2201/2054; F21S 4/28
See application file for complete search history.

(56) References Cited

U.S. PATENT DOCUMENTS

2015/0351325 A1* 12/2015 Shelor .................... H05B 45/20
                                                47/58.1 LS
2019/0110406 A1* 4/2019 Adams .................. A01G 7/045

FOREIGN PATENT DOCUMENTS

CN 108758480 A * 11/2018
TW M448902 U 3/2013

* cited by examiner

*Primary Examiner* — Renan Luque
(74) *Attorney, Agent, or Firm* — Alan D. Kamrath; Karin L. Williams; Mayer & Williams PC

(57) ABSTRACT

Disclosures of the present invention describe a plant light raising and lowering apparatus. Particularly, a control module is configured for controlling a rope winch to complete at least one inching rotation along a clockwise direction or a counterclockwise direction, such that a base is driven by the rope winch so as to have an upward inching movement or a downward inching movement. Moreover, a counter is adopted for counting the direction, times and/or frequency of the inching rotation, and therefore the control module is able to know a total moving distance of the base by using the inching movement recording unit to record each time of the upward inching movement and each time of the downward inching movement. Therefore, a user is able to control the base to move back to a specific position such as an initial position or a previously-staying position.

17 Claims, 10 Drawing Sheets

PLANT LIGHT RAISING AND LOWERING APPARATUS

BACKGROUND OF THE INVENTION

1. Field of the Invention

The present invention relates to the technology field of plant lights, and more particularly to a plant light raising and lowering apparatus.

2. Description of the Prior Art

It is well known that, sunlight, water and air are three critical biotic factors for living objects. For example, plants will not get growth successfully and even tend to wither in the case of losing the illumination of sunlight. Accordingly, an artificial light is developed and adopted for use in facilitating the plants that are cultivated in a greenhouse grow successfully. As a result, various plant lights are therefore designed and proposed.

After practical using the plant light, plant growers all know that, the plant light that is always fixed at an identical height would bring various influences to the plants under cultivation. For example, for a specific plant that is in its young seedling state, an illumination radiated from the height-fixed plant light may exhibit an inadequate brightness and a weak heat. On the contrary, the same illumination provided by the identical plant light supplies bright light with high temperature to the plant that grows to have a certain height. In fact, the forgoing height-fixed plant light will not bring apparent influences to those commonly-cultivated vegetables because there is no large height difference between the height of a young vegetable seedling and that of a mature vegetable. However, there are still many plants that have large height difference between its young-state height and its mature-state height. From example, the climbing plants like *Epipremnum aureum*. Accordingly, the height-fixed plant light is hence not suitable for being applied in facilitating the plant growth of the forgoing climbing plants.

For solving above-mentioned issues, Taiwan Patent No. M448902 discloses a plant cultivating apparatus. FIG. 1 shows a system framework view of the plant cultivating apparatus disclosed by Taiwan Patent No. M448902. The plant cultivating apparatus 1' comprises: a cultivation room 11', a planting nursery 12' arranged in the cultivation room 11', a plurality of light source 13', and a control module 14'. From FIG. 1, it is clear that there are many plant PL' that are cultivated in the planting nursery 12', and each the light source 13' consists of a lifting unit 131' and a plurality of lighting devices 132' carried by the lifting unit 131'. It is easily understood that, the control module 14' is configured for controlling the lighting devices 132' supply illumination to the plant PL' that are cultivated in the planting nursery 12'. It is worth noting that, with the gradual growth of the plant PL', the control module 14' is further configured to control the lifting unit 131' to correspondingly raising the lighting devices 132'. Briefly speaking, the plant cultivating apparatus 1' described above is not a height-fixed plant light system.

However, after the practical use of the plant cultivating apparatus 1', it is found that the mechanism design of the lifting unit 131' is not satisfied with the actual demands of plant growers. Actually, travel of action of the lifting unit 131' is similar to that of a rolling shutter or a telescopic clothes rack. As described more in detail below, plant grower is required to manually control each action of the lifting unit 131'. For instance, the lifting unit 131' is controlled to raise or lower the hanging height of the lighting devices 132' after the plant grower correspondingly press a moving-up button or a moving-down button of the control module 14'. It is worth knowing that, the plant PL' commonly has a slow growth, such that the height of the plant PL' certainly has a day-by-day or week-by-week variation. However, the day-by-day variation of the height of the plant PL' may be minor, causing the plant grower fail to find that. As a result, it is impossible for the plant grower to adjust the hanging height of the lighting devices 132' to reach a best height by operation the control module 14'. On the other hand, the plant grower also fail to determine when is the timing to control the lifting unit 131' to raise or lower the hanging height of the lighting devices 132'. Eventually, the most frequently occurring issue is that the lighting devices 132' carried by the lifting unit 131' are over raised or exceedingly lowered, causing the plant grower is forced to continuously notice and even adjust the hanging height of the lighting devices 132' every day.

In addition, FIG. 1 also depicts that, the cultivation room 11' has a constant height, such that the maximum travel distance is hence limited when the lifting unit 131' is controlled to raise the lighting devices 132'. It is aware that, in the case of the maximum travel distance of the lifting unit 131' is limited by the constant height of the cultivation room 11', the lifting unit 131' and/or the lighting devices 132' certainly become obstructers when the plant grower executes at least one periodical environment finishing of the planting nursery 12', such as disinsection, de-leafing, and pruning. In general, the plant grower firstly makes the lifting unit 131' to achieve its maximum travel distance, and then starts to execute the periodical environment finishing of the planting nursery 12'. Consequently, the plant grower makes the lifting unit 131' to drive the lighting devices 132' backing to an original hanging height after completing the periodical environment finishing. It is a pity that, the plant cultivating apparatus 1' does not include a height sensor, causing the plant grower unable to know the correct value of the original height of the lighting devices 132'. As a result, the only way for the plant grower to make the lighting devices 132' move back to their original height is repeatedly pressing the moving-up button or the moving-down button of the control module 14'.

From above descriptions, it is understood that, there is still a room for improvement in the conventional plant cultivating apparatus 1'. In view of that, inventors of the present application have made great efforts to make inventive research and eventually provided a plant light raising and lowering apparatus.

SUMMARY OF THE INVENTION

The primary objective of the present invention is to disclose a plant light raising and lowering apparatus, comprising: a base, a plurality of light source carrying base, a rope, a rope winch, a telescopic frame, and a control module. Particularly, there is a counter unit and an inching movement recording unit provided in the control module, and the control module is configured for controlling a rotary shaft of a motor of the rope winch to complete at least one inching rotation along a clockwise direction or a counterclockwise direction, such that the base is driven by the rope so as to have an upward inching movement or a downward inching movement. In the present invention, the counter is adopted for counting the direction, times and/or frequency of the inching rotation, such that the control module is able to know a total moving distance of the base by using the inching movement recording unit to record each time of the upward inching movement and each time of the downward inching movement. Consequently, by making a go-back command to the control module, a user is able to control the base to move back to a specific position such as an initial position or a previously-staying position.

For achieving the primary objective of the present invention, the present invention provides an embodiment of the plant light raising and lowering apparatus, comprising:
a frame assembly;
a first accommodating unit, being disposed on the frame assembly, and accommodating with a lower-end pivoting module;
a second accommodating unit, being fixed at a position that is over the first accommodating unit, and accommodating with a upper-end pivoting module;
a telescopic frame, being connected between the upper-end pivoting module and the lower-end pivoting module;
a plurality of light source carrying bases, being connected to the frame assembly, and each of the plurality of light source carrying base carrying with a light source;
a rope winch assembly, comprising a motor and a rope winch, wherein the motor is configured for driving the rope winch to wind/unwind at least one rope that is connected to the frame assembly; and
a control module, being coupled to the motor, and being provided with a counter unit and an inching movement recording unit therein;
wherein the control module is configured for controlling a rotary shaft of the motor to complete at least one time of a first-direction inching rotation and/or at least one time of a second-direction inching rotation, so as to drive the rope winch to wind or unwind the rope, such that the frame assembly is driven by the rope so as to finish an upward inching movement or a downward inching movement;
wherein the telescopic frame correspondingly complete a compression travel or an extension travel during the upward inching movement or the downward inching movement;
wherein the counter unit is adopted for counting at least one occurrence time and a total number of times of the first-direction inching rotation and the second-direction inching rotation, and the inching movement recording unit being configured for recording an amount of moving distance of the upward inching movement and the downward inching movement;
wherein the control module controls the motor to drive the rope winch to wind and/or unwind the rope according to the amount of moving distance recorded by the inching movement recording unit, thereby making the frame assembly achieve a one-time movement so as to reach a specific position.

In the embodiment of the plant light raising and lowering apparatus, the specific position is selected from the group consisting of original position, user-setting position, and previously-staying position.

In the embodiment of the plant light raising and lowering apparatus, the frame assembly comprises:
a first supporting rod;
a second supporting rod, being parallel to the first supporting rod; and
a base, being connected between one side of the first supporting rod and one side of the second supporting rod, and being adopted for supporting the first accommodating unit.

In the embodiment of the plant light raising and lowering apparatus, a first supporting post and a second supporting post are vertically disposed on the first supporting rod and the second supporting rod, respectively.

In one practicable embodiment, the plant light raising and lowering apparatus further comprises:
a plurality of first stay cables, wherein each of the first stay cables is connected between the first supporting rod and the first supporting post; and
a plurality of second stay cables, wherein each of the second stay cables is connected between the second supporting rod and the second supporting post.

In one practicable embodiment, the plant light raising and lowering apparatus further comprises:
a sensor unit, being coupled to the control module, and being configured for detecting a rotor position of the motor and/or a rotor speed of the motor, such that the counter unit of the control module is able to count the occurrence time and the total number of times of the first-direction inching rotation and the second-direction inching rotation.

In the embodiment of the plant light raising and lowering apparatus, the sensor unit comprises a photo-interrupter and a disk with a plurality of black bars.

In one practicable embodiment, the plant light raising and lowering apparatus further comprises:
at least one successive-detection distance sensing unit, being attached to the light source carrying base, and also being coupled to the control module, thereby being controlled to detect an illumination distance between the light source carrying base and at least one plant that is cultivated in a planting nursery; and
a light sensing module, comprising:
a light emitting unit, being attached on the first supporting rod or the second supporting rod; and
a light receiving unit, being attached on the second supporting rod or the first supporting rod, so as to remotely opposite to the light emitting unit.

In the embodiment of the plant light raising and lowering apparatus, the control module 1C further comprises:
a micro controller, being coupled to the counter unit and the inching movement recording unit, the sensor unit, the light emitting unit, the light receiving unit, and the successive-detection distance sensing unit;
a motor driver, being coupled to the micro controller, and being electrically connected to the motor;
a light source driver, being coupled micro controller, and being electrically connected to the plurality of light sources; and
a human machine interface (HMI), being coupled to the micro controller, and comprises a keyboard and display screen.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a plant light raising and lowering apparatus disclosed by the present invention, embodiments of the present invention will be described in detail with reference to the attached drawings hereinafter.

First Embodiment

Figure 1:
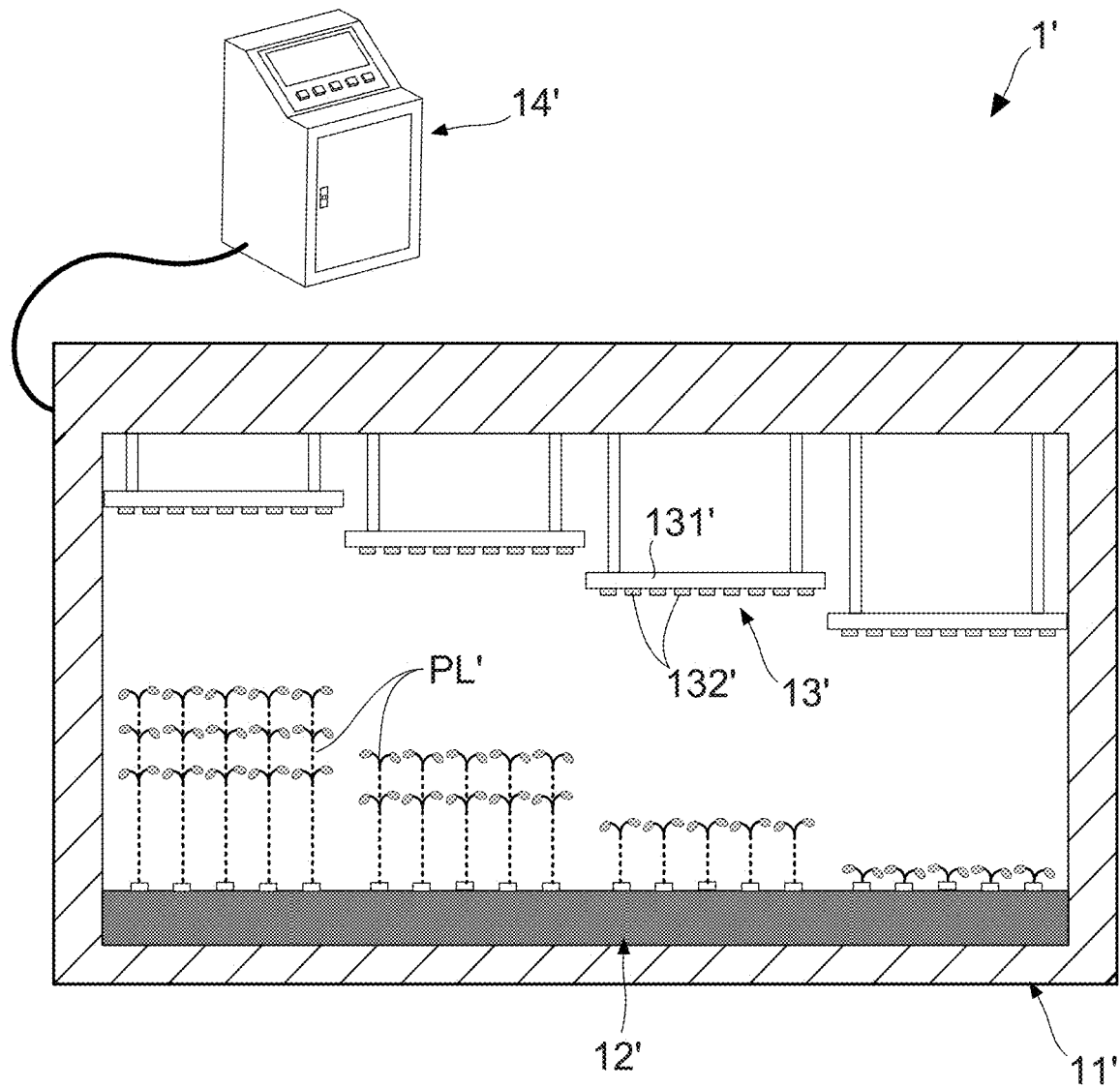
FIG. 1 shows a system framework view of the plant cultivating apparatus disclosed by Taiwan Patent No. M448902.
Figure 2:
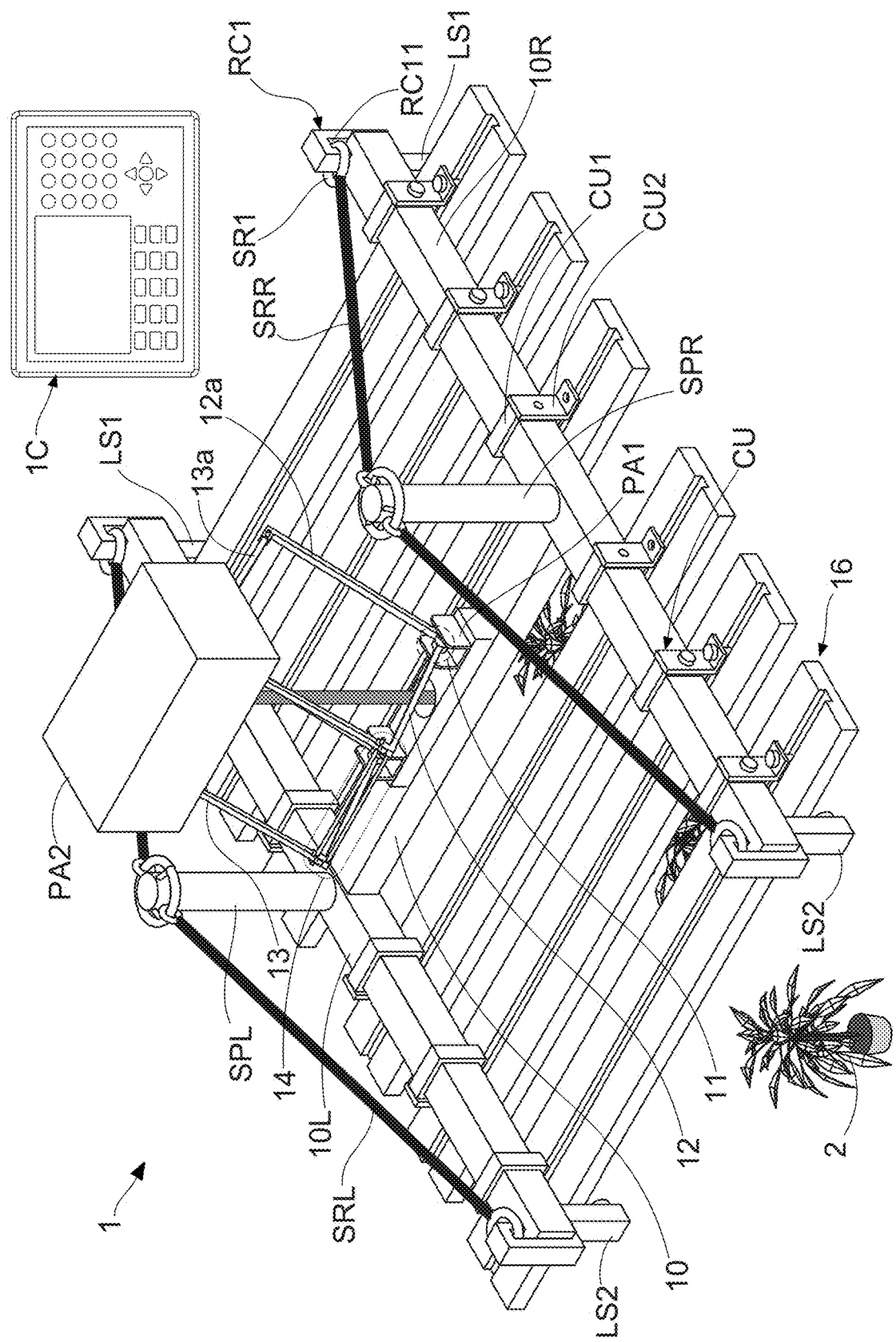
FIG. 2 shows a first stereo diagram of a first embodiment of a plant light raising and lowering apparatus according to the present invention.
Figure 3:
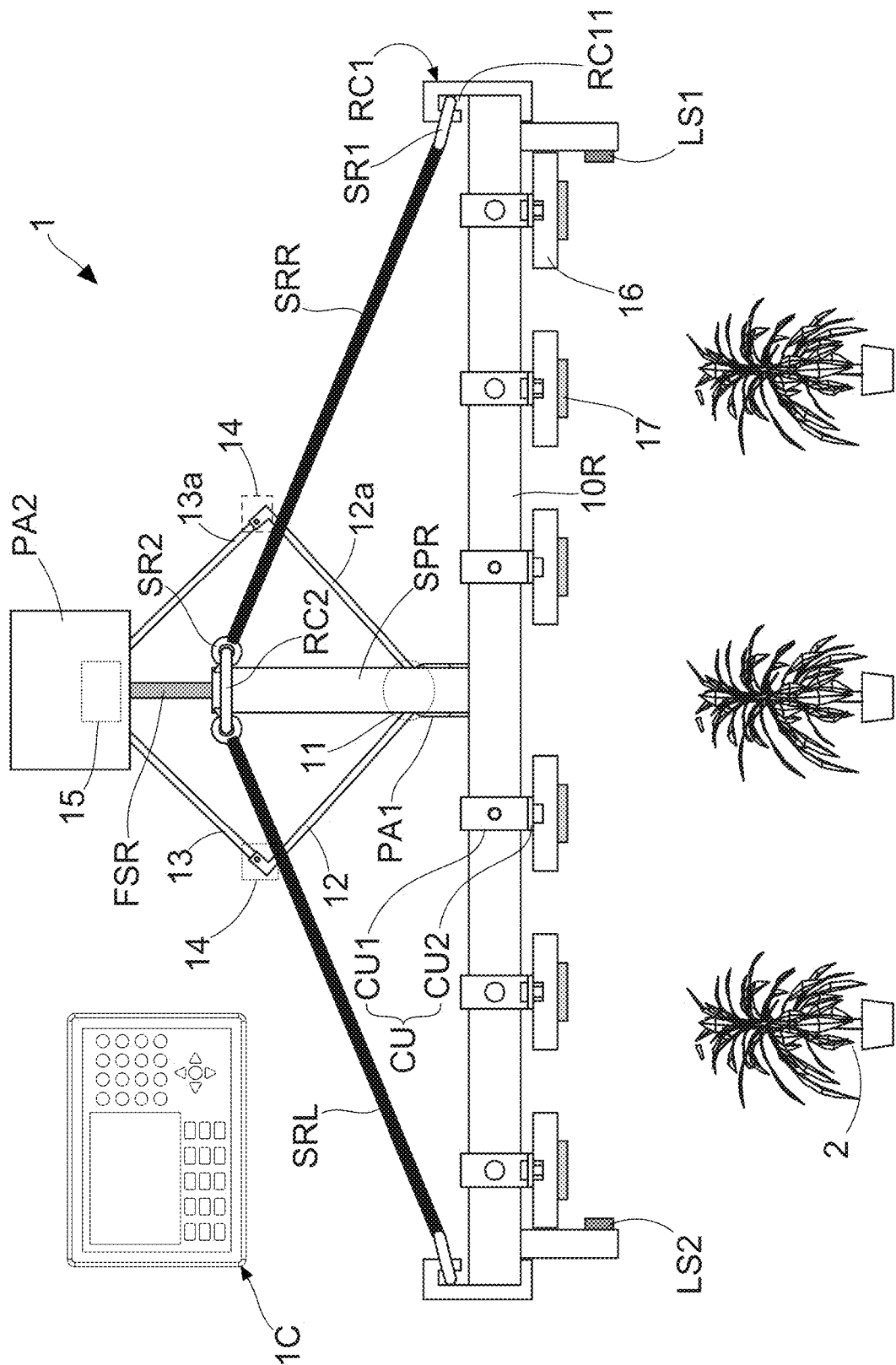
FIG. 3 shows a second stereo diagram of the first embodiment of the plant light raising and lowering apparatus.
Figure 4:
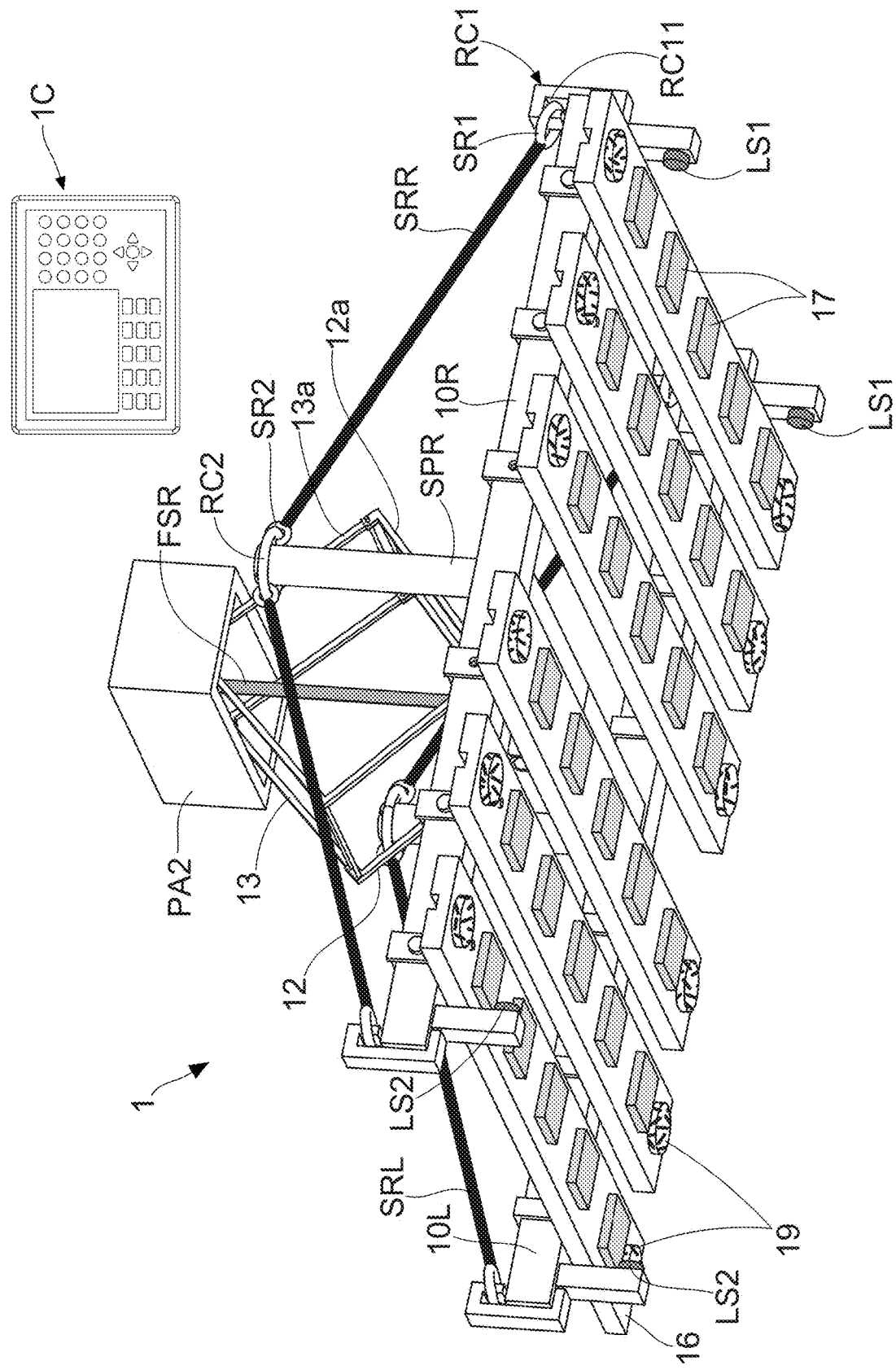
FIG. 4 shows a third stereo diagram of the first embodiment of the plant light raising and lowering apparatus.
Figure 5:
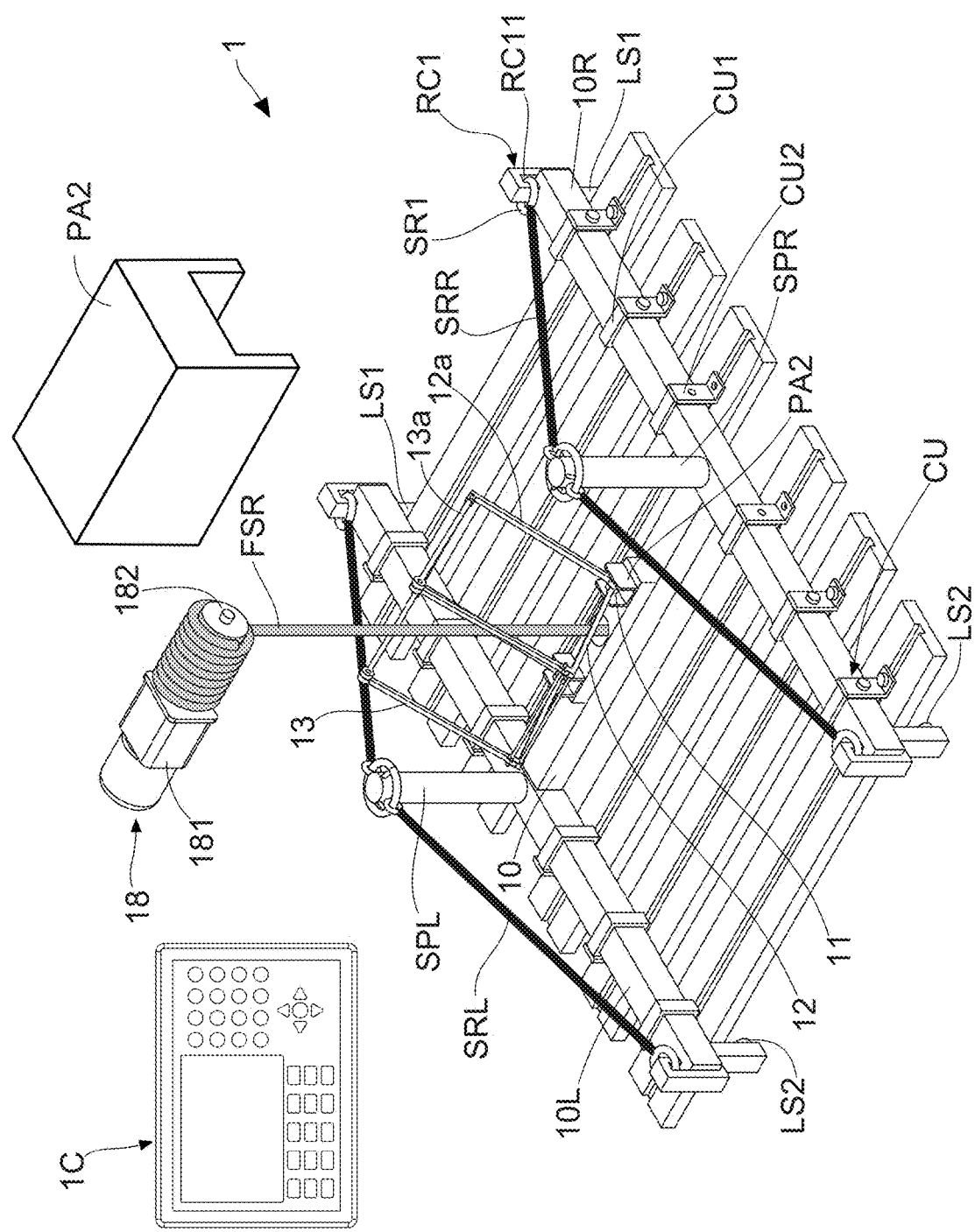
FIG. 5 shows a stereo diagram for describing a base and a plurality of light source carrying bases of the plant light raising and lowering apparatus.

With reference to FIG. 2, there is shown a first stereo diagram of a first embodiment of a plant light raising and lowering apparatus according to the present invention. Moreover, FIG. 3 illustrates a second stereo diagram of the first embodiment of the plant light raising and lowering apparatus, and FIG. 5 depicts a third stereo diagram of the first embodiment of the plant light raising and lowering apparatus. From FIG. 2, FIG. 3 and FIG. 4, it is known that the plant light raising and lowering apparatus 1 of the present invention comprises: a frame assembly consisting of a first supporting rod 10R, a second supporting rod 10L and a base 10, a lower-end pivoting module 11, a first accommodating unit PA1, a second accommodating unit PA2, an upper-end pivoting module 15, a telescopic frame, a plurality of light source carrying bases 16, a plurality of light sources 17, and a control module 1C. In the present invention, the second supporting rod 10L is parallel to the first supporting rod 10R, and the base 10 is connected between one side of the first supporting rod 10R and one side of the second supporting rod 10L, and is adopted for supporting the first accommodating unit PA1. In addition, he telescopic frame comprises a pair of lower suspension arms (12, 12a), a pair of upper suspension arms (13, 13a), and a pivotal connection unit 14 that is connected between the pair of lower suspension arms (12, 12a) and the pair of upper suspension arms (13, 13a).

Figure 6A:
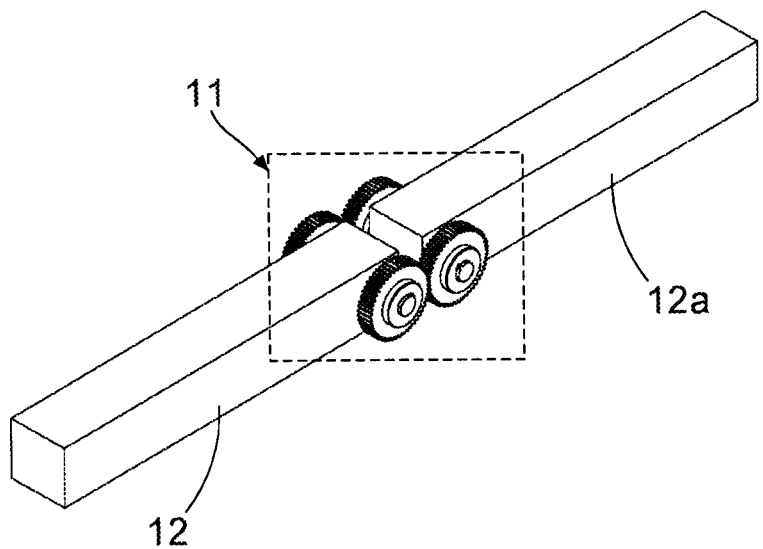
FIG. 6A shows a stereo diagram of a lower-end pivoting module of the plant light raising and lowering apparatus.
Figure 6B:
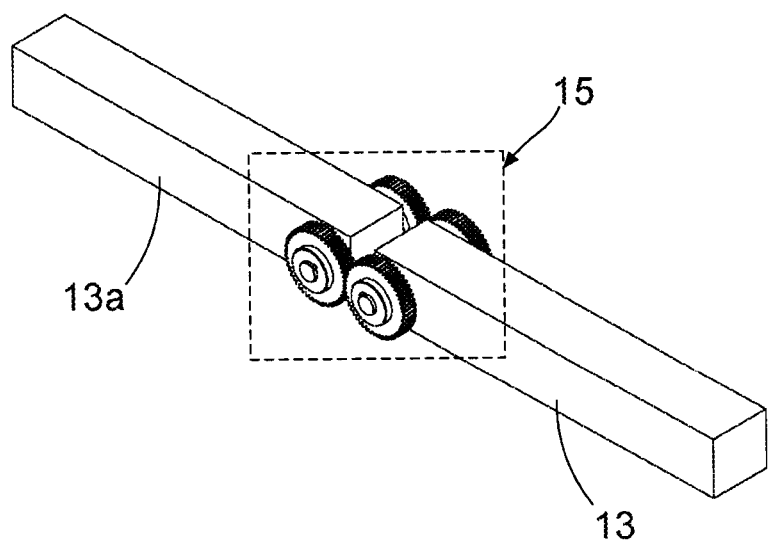
FIG. 6B shows a stereo diagram of an upper-end pivoting module of the plant light raising and lowering apparatus.

Please simultaneously refer to FIG. 5, which shows a stereo diagram for describing the base 10 and the plurality of light source carrying bases 16 of the plant light raising and lowering apparatus 1. Moreover, FIG. 6A shows a stereo diagram of the lower-end pivoting module 11 of the plant light raising and lowering apparatus 1, and FIG. 6B depicts a stereo diagram of the upper-end pivoting module 15 of the plant light raising and lowering apparatus 1. According to the particular design of the present invention, the first accommodating unit PA1 is disposed on the base 10, and the lower-end pivoting module 11 is accommodated in the first accommodating unit PA1. On the other hand, the second accommodating unit PA2 is fixed at a position that is over the first accommodating unit PA1, and accommodating with an upper-end pivoting module 15.

As described more in detail below, the two lower suspension arms (12, 12a) are connected to each other by one end thereof, both the two lower suspension arms (12, 12a) are connected to the lower-end pivoting module 11 by one end thereof, and both the two upper suspension arms (13, 13a) are connected to the upper-end pivoting module 15 by one end thereof. It is worth noting that, the respective upper suspension arms (13, 13a) being connected with the respective lower suspension arms (12, 12a) through a pivotal connection unit 14. Moreover, as FIG. 6A shows, the lower-end pivoting module 11 comprises two first gears and two second gears, wherein the two first gears are disposed on two sides of the lower suspension arm 12, and the two second gears are disposed on two sides of the lower suspension arm 12a. As such, by letting the respective first gears engage with the respective second gears, the two lower suspension arms (12, 12a) are connected to the lower-end pivoting module 11. Similarly, as FIG. 6B shows, the upper-end pivoting module 15 comprises two third gears and two fourth gears, wherein the two third gears are disposed on two sides of the upper suspension arm 13, and the two fourth gears are disposed on two sides of the upper suspension arm 13a. As such, by letting the respective third gears engage with the respective forth gears, the two upper suspension arms (13, 13a) are connected to the lower-end pivoting module 15.

On the other hand, the plurality of light source carrying bases 16 are connected to the base 10, and each of the plurality of light source carrying base 16 carries with one light source 17, such as an incandescent lamp, a fluorescent light, a lighting device using light emitting diodes (LEDs), a lighting device using quantum dots (QDs) LEDs, or a lighting device using organic light emitting diodes (OLEDs). On the other hand, the rope winch assembly 18 comprises a motor 181 and a rope winch 182, wherein the motor 181 is configured for driving the rope winch 182 to wind/unwind a first rope FSR that is connected to the base 10.

First Technology Feature of the Plant Light Raising and Lowering Apparatus

Figure 7:
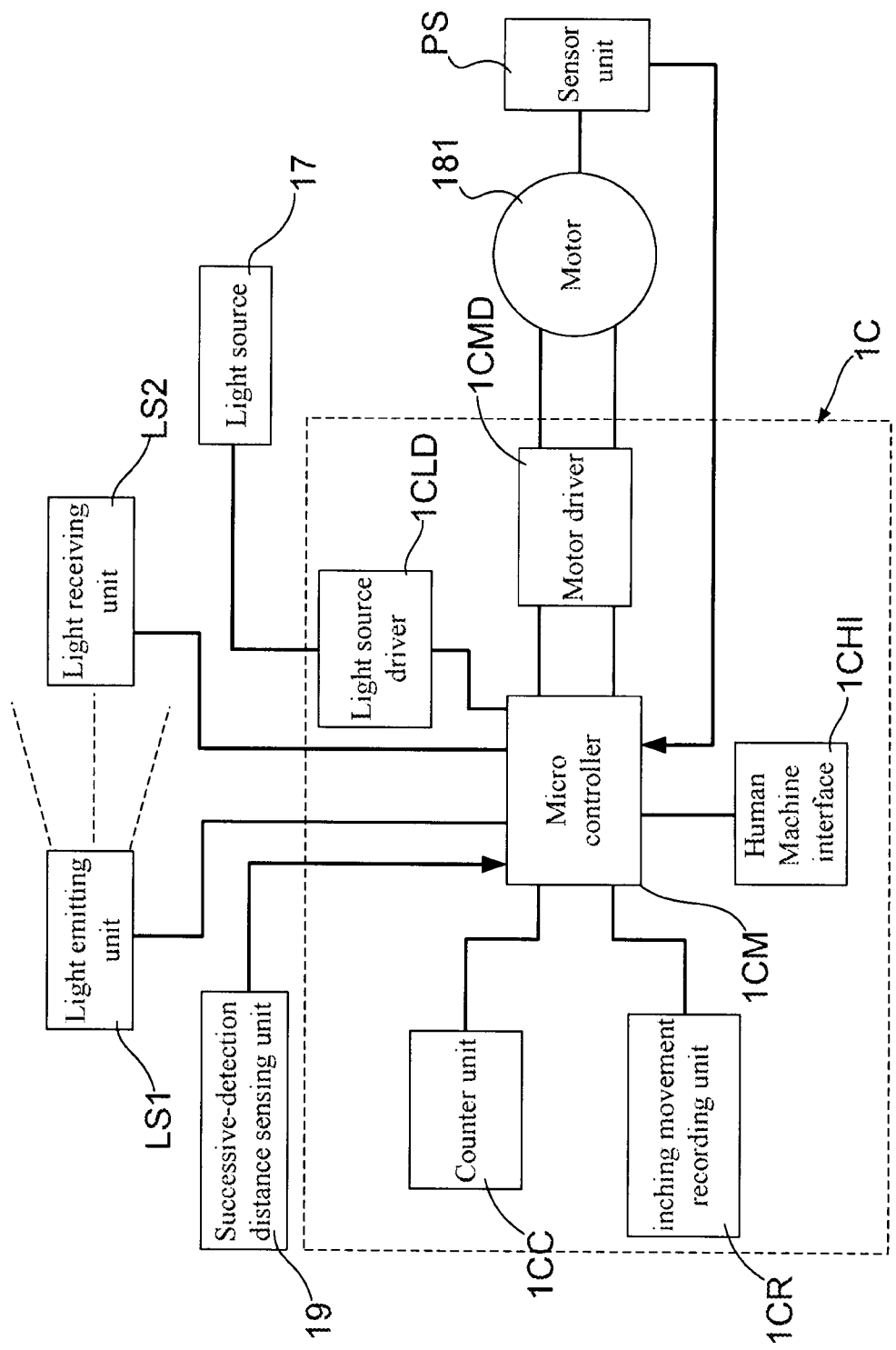
FIG. 7 shows a block diagram of a control module of the plant light raising and lowering apparatus.

Referring to FIGS. 2-5 again, and please simultaneously refer to FIG. 7, there is shown a block diagram of the control module 1C of the plant light raising and lowering apparatus 1. In the present invention, the control module 1C is coupled to the motor 181, so as to control a rotary shaft of the motor 181 to complete at least one time of a first-direction inching rotation and/or at least one time of a second-direction inching rotation, thereby driving the rope winch 182 to wind or unwind the first rope FSR. Consequently, the base 10 is driven by the first rope FSR so as to finish an upward inching movement or a downward inching movement. During the upward inching movement or the downward inching movement, the telescopic frame correspondingly completes a compression travel or an extension travel. Particularly, the control module 1C is provided with a counter unit 1CC and an inching movement recording unit 1CR therein. As described more in detail below, the counter unit 1CC is adopted for counting at least one occurrence time and a total number of times of the first-direction inching rotation and the second-direction inching rotation, and the inching movement recording unit 1CR is configured for recording an amount of moving distance of the upward inching movement and the downward inching movement.

FIG. 7 also depicts that the control module 1C further comprises: a micro controller 1CM, a motor driver 1CMD, a light source driver 1CLD, and a human machine interface (HMI) 1CHI, wherein the micro controller 1CM is coupled to the counter unit 1CC and the inching movement recording unit 1CR, and the sensor unit PS. Moreover, the motor driver 1CMD is coupled to the micro controller 1CM and electrically connected to the motor 181, and the light source driver 1CLD is coupled micro controller 1CM and is electrically connected to the plurality of light sources 17. On the other hand, the human machine interface (HMI) 1CHI is coupled to the micro controller 1CM, and comprises a keyboard and display screen.

As described more in detail below, the keyboard of the human machine interface 1CHI comprises an upward inching motion button, a downward inching motion button, an initial position return button, a user-set motion button, and a go-back motion button. It is easily understood that, after a plant grower presses the upward inching motion button, the micro controller 1CM controls the motor driver 1CMD to make a rotary shaft of the motor 181 to complete a first-direction inching rotation, thereby driving the base 10 to achieve an upward inching motion. On the contrary, in case of the downward inching motion button being presses, the micro controller 1CM controls the motor driver 1CMD to drive the rotary shaft of the motor 181 to finish a second-direction inching rotation, so as to drive the base 10 carrying out a downward inching motion. Herein, the forgoing first direction is clockwise direction or counterclockwise direction, and the forgoing second direction is counterclockwise direction or clockwise direction. Moreover, it is worth explaining that, the counter unit 1CC is adopted for counting at least one occurrence time and a total number of times of the first-direction inching rotation and the second-direction inching rotation, and the inching movement recording unit 1CR is configured for recording an amount of moving distance of the upward inching movement and the downward inching movement. As a result, the control module 1C is facilitated to control the motor 181 to drive the rope winch 182 to wind and/or unwind the rope according to the amount of moving distance recorded by the inching movement recording unit 1CR, such that the frame assembly (base 10) can easily be moved a specific position after achieving a one-time movement.

Figure 8:
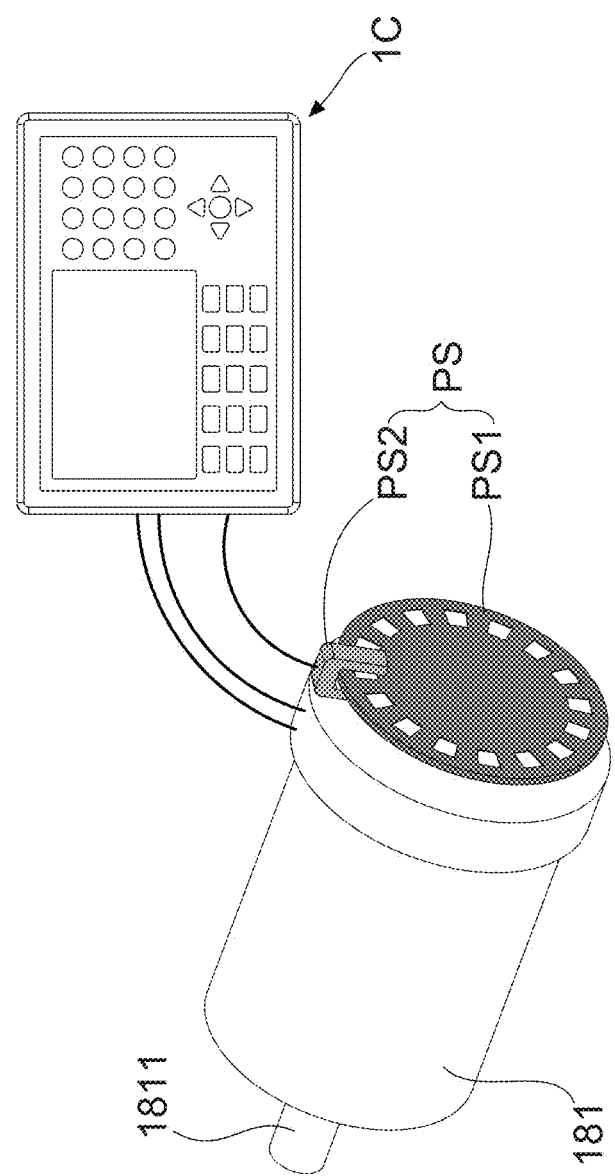
FIG. 8 shows a block diagram for describing a motor and a sensing unit.

In one practicable embodiment, it is able to automatically measure the moving distance of the base 10 by monitoring a rotor position of the motor 181 and/or a rotor speed of the motor 181. FIG. 8 shows a block diagram for describing the motor 181 and the sensing unit PS. In one embodiment, the sensor unit PS comprises a photo-interrupter PS2 and a disk PS1 with a plurality of black bars. By letting a sensor unit PS be coupled to the control module 1C, the sensor unit PS is therefore configured for detecting the rotor position of the motor 181 and/or the rotor speed of the motor 181, such that the counter unit 1CC of the control module 1C is able to count the occurrence time and the total number of times of the first-direction inching rotation and the second-direction inching rotation. For example, in the case of the motor 181 finishing two times of first-direction inching rotation and one time of second-direction inching rotation, the inching movement recording unit 1CR would record that the base 10 has completed two times of upward inching motion and one time of downward inching motion. As a result, the micro controller 1CM calculates that there is an upward inching motion finished by the base 10. In such case, the plant grower is able to press the go-back motion button of the keyboard of the human machine interface 1CHI, such that the control module 1C controls the motor 181 to drive the rope winch 182 to unwind the rope FSR according to the amount of moving distance recorded by the inching movement recording unit 1CR, thereby making the base 10 to move back to its previously-staying position or original position.

Briefly speaking, one of various technology features of the present invention is to provide a counter unit 1CC and inching movement recording unit 1CR in the control module 1C for immediately recording an amount of moving distance of the upward inching movement and the downward inching movement that are finished by the base 10 (frame assembly). By such arrangements, even if the plant grower forgets the correct value of a upward motion distance or a downward motion distance of the frame assembly, it is convenient for the plant grower to make the base 10 go back to its previously-staying position or original position by way of merely pressing the go-back motion button of the keyboard of the human machine interface 1CHI. It is easily to known that, the forgoing previously-staying position may be a specific position selected from the group consisting of original position and user-setting position.

Herein, it needs to further explain that, although FIG. 8 depicts that the sensor unit PS comprises a photo-interrupter PS2 and a disk PS1 with a plurality of black bars, the sensor unit PS can also be a hall sensor in other practicable embodiment.

Second Technology Feature of the Plant Light Raising and Lowering Apparatus

In the present invention, it is particularly that the plant light raising and lowering apparatus 1 further comprises at least one successive-detection distance sensing unit 19, which is attached to the light source carrying base 16, and also is coupled to the control module 1C, thereby being controlled to detect an illumination distance between the light source carrying base 16 and at least one plant 2 that is cultivated in a planting nursery. In addition, the plant light raising and lowering apparatus 1 further comprises a light sensing module, which is adopted for determining whether the top of the plant 2 is very close to the base 10 and/or the light source carrying base 16 or not. From FIG. 4, it is found that the respective successive-detection distance sensing units 19 are connected to the respective light source carrying bases 16. However, of course, the successive-detection distance sensing units 19 can also be distributedly disposed on the bottom of the base 10. In one practicable embodiment, the successive-detection distance sensing unit 19 comprises a detection signal emitter and a signal receiver, wherein the detection signal is an IR light. The IR light is well known that is applied in parking sensors. However, the successive-detection distance sensing unit 19 is not limited to consist of an IR emitter and an IR receiver. In other practicable embodiment, the successive-detection distance sensing unit 19 can also be designed to comprise a sound wave emitter and a sound wave receiver. It is worth noting that, the present invention particularly lets the successive-detection distance sensing unit 19 to complete an operation of successive distance detecting in a short time interval, in order to rule out the influences caused by the illumination light that is provided by the light source 17. In other words, the detection signal emitter of the successive-detection distance sensing unit is configured to successively emit an identical detection signal, and then the signal receiver successively receives the detection signal in a short time interval.

As such, even if a part of the detection signal may be shielded or interfered by the illumination light that is provided by the light source 17, the other parts of the detection signal can still reach the top of the plant 2 that is cultivated in a planting nursery. Briefly speaking, the present invention particularly lets the successive-detection distance sensing unit 19 to complete an operation of successive distance detecting in a short time interval, so as to rule out the influences caused by the illumination light that is provided by the light source 17. As a result, by using the successive-detection distance sensing unit 19, the control module 1C is able to immediately know an illumination distance between the light source carrying base 16 and the plant 2, so as to control the motor 181 adaptively operate for making the base 10 moving upwardly with response to the gradual growth of the plant 2.

On the other hand, the light sensing module comprises a light emitting unit LS1 and a light receiving unit LS2. In which, the light emitting unit LS1 is attached on the first supporting rod 10R or the second supporting rod 10L, and the light receiving unit LS2 is attached on the second supporting rod 10L or the first supporting rod 10R, so as to remotely opposite to the light emitting unit LS1. It is aware that, the forgoing successive-detection distance sensing unit 19 is adopted for monitoring the distance between the plant 2 and the base 10 by using a vertical detection. On the contrary, the light sensing module consisting of a light emitting unit LS1 and a light receiving unit LS2 is configured for determining whether the top of the plant 2 is very close to the base 10 and/or the light source carrying base 16 or not.

Third Technology Feature of the Plant Light Raising and Lowering Apparatus

As FIG. 2 and FIG. 3 show, there are a first supporting post SPR and a second supporting post SPL vertically disposed on the first supporting rod 10R and the second supporting rod 10L, respectively. In addition, the plant light raising and lowering apparatus 1 further comprises a plurality of first stay cables SRR and a plurality of second stay cables SRL, wherein each of the first stay cables SRR is connected between the first supporting rod 10R and the first supporting post SPR. On the other hand, each of the second stay cables SRL is connected between the second supporting rod 10L and the second supporting post SPL. Moreover, FIG. 2, FIG. 3, FIG. 4, and FIG. 5 also depict that, a first cord fastener SR1 and a second cord fastener SR2 are disposed at two ends of each the first stay cables SRR as well as two ends of each the second stay cables SRL. It is worth noting that, a plurality of first cable connecting members RC1 are disposed on the first supporting rod 10R and the second supporting rod 10L, wherein each the cable connecting member RC1 has a connection portion RC11 for connecting the first cord fastener SR1. Moreover, a plurality of second cable connecting members RC2 are disposed on the first supporting rod 10R and the second supporting rod 10L, and are adopted for connecting the second cord fastener SR2.

Figure 9:
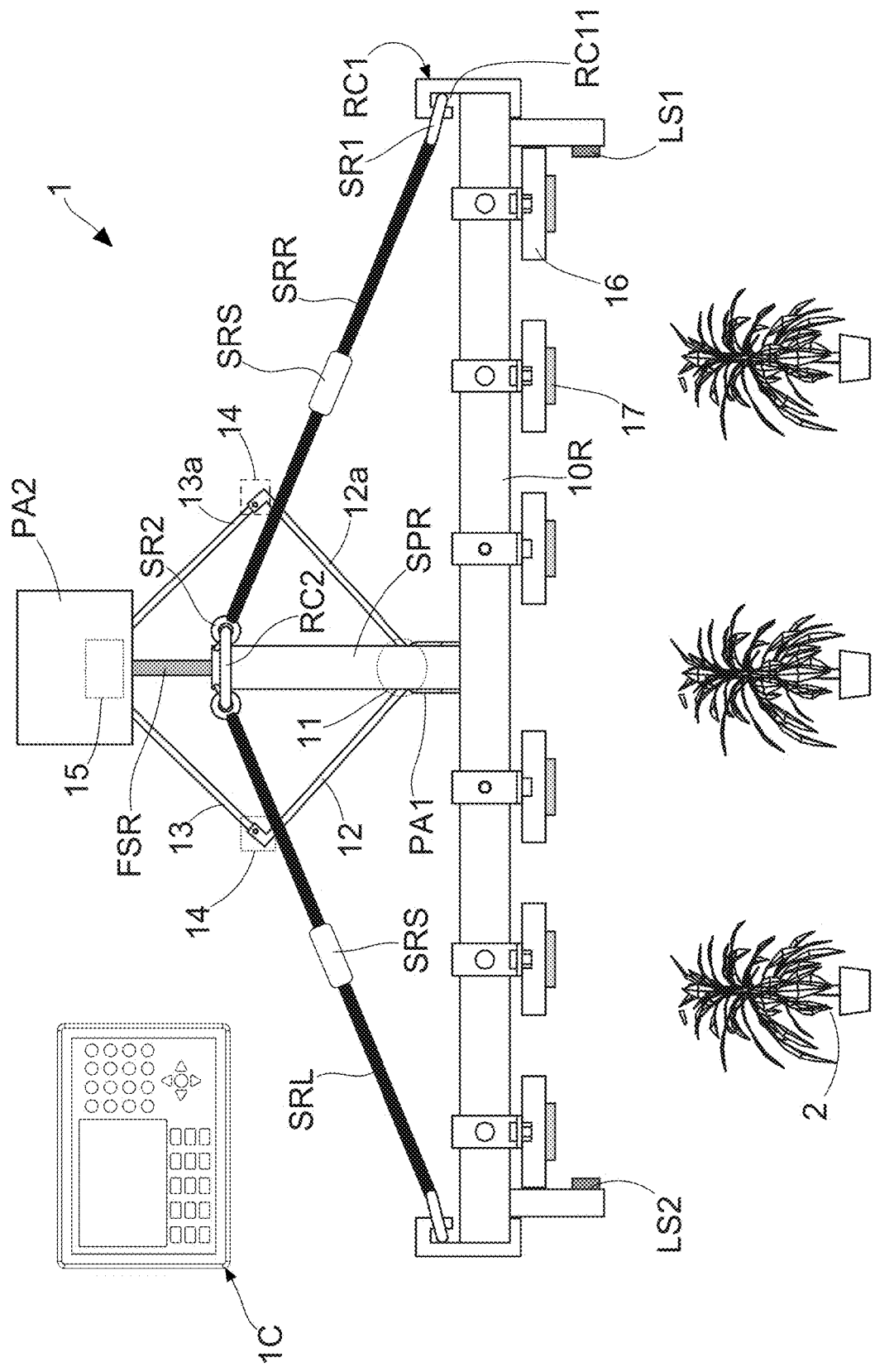
FIG. 9 shows a side view of the plant light raising and lowering apparatus.

FIG. 9 shows a side view of the plant light raising and lowering apparatus. From FIG. 9, it is found that a plurality of cable tensioners SRS are connected to the plurality of first stay cables SRR and the plurality of second stay cables SRL, and are used for adjusting a first cable tension of each the first stay cable SRR and a second cable tension of each the second stay cable SRL.

Fourth Technology Feature of the Plant Light Raising and Lowering Apparatus

In the present invention, the frame assembly, comprising a base 10, a first supporting rod 10R and a second supporting rod 10L, is particularly designed to supporting a few of light source carrying bases 16 and a number of light sources 17. In addition, the first stay cables SRR and the second stay cables SRL are adopted for maintaining the horizontal stability of the frame assembly as well as facilitating the frame assembly have high loading capacity. Therefore, under the sue of the first stay cables SRR and the second stay cables SRL, the present invention further designs that the first supporting rod 10R, the second supporting rod 10L and the base 10 are all telescopic.

Furthermore, the plant light raising and lowering apparatus 1 further comprises a plurality of connection units CU, which are adopted for connecting the plurality of light source carrying bases 16 to the frame assembly. In the present invention, each of the plurality of connection units CU comprises a first connection member CU1 and a second connection member CU2, wherein the first connection member CU1 is disposed on the frame assembly, and the second connection member CU2 is connected between the first connection member CU1 and one of the plurality of light source carrying bases 16. FIG. 2 and FIG. 3 depict that the first connection member CU1 is a rectangular frame that is provided with a screw hole. On the other hand, the second connection member CU2 is an L-shaped plate, and there are two screw holes formed on a long side and a short side of the L-shaped plate, respectively. It is easily understood that, a fastening member like a bolt or a screw can be used for passing through the screw hole of the L-shaped plate (i.e., second connection member CU2) and the screw hole of the rectangular frame (i.e., second connection member CU1), so as to make the first connection member CU1 be fixed onto the first supporting rod 10R and/or the second supporting rod 10L. Subsequently, another one fastening member like a bolt or a screw can be continuously used for passing through the screw hole of the L-shaped plate, so as to make the second connection member CU2 be attached on onto the light source carrying base 16. As a result, the light source carrying base 16 is connected to the base 10.

Second Embodiment

Figure 10:
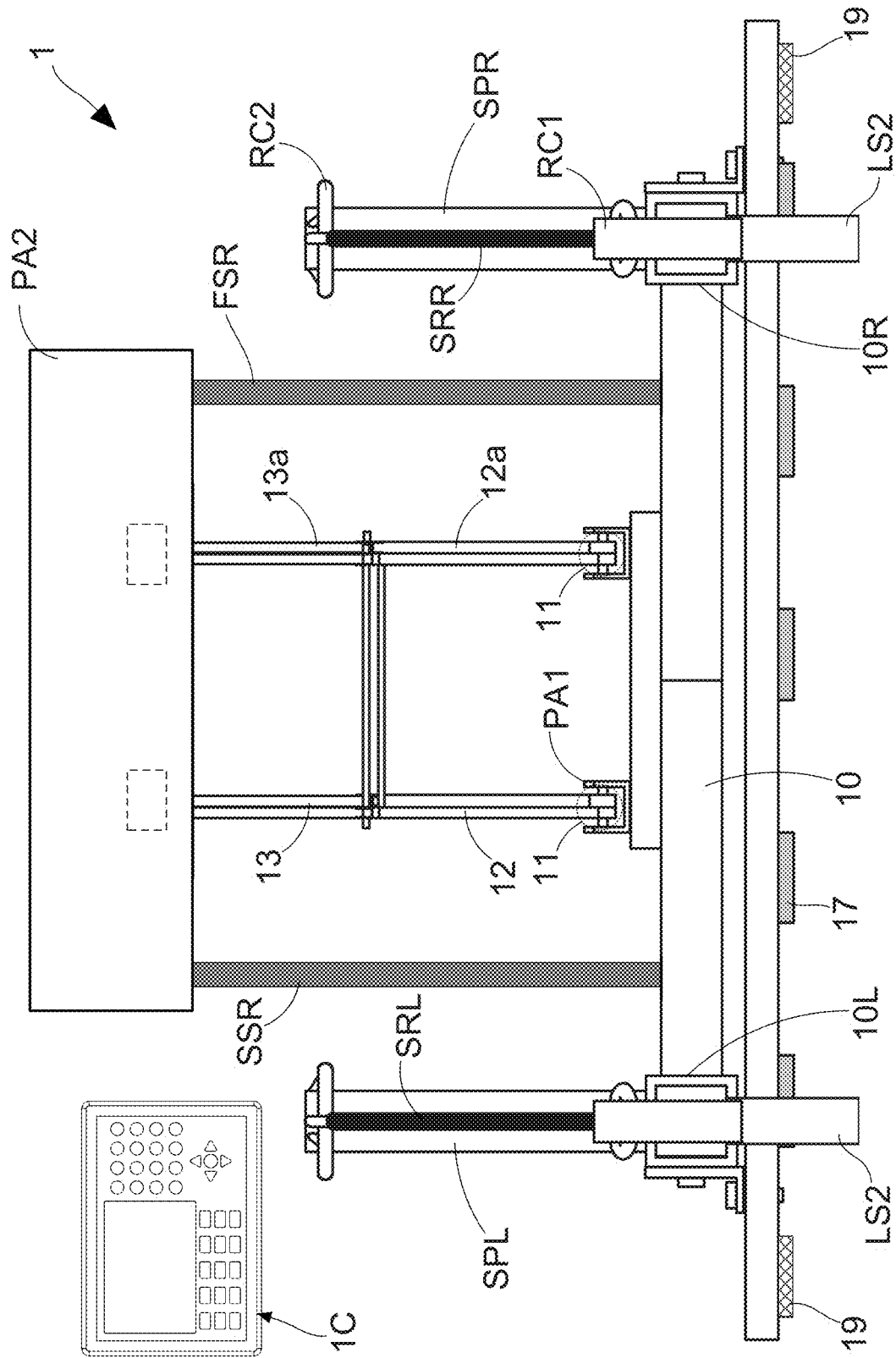
FIG. 10 shows a side view of a second embodiment of the plant light raising and lowering apparatus according to the present invention.

FIG. 10 shows a side view of a second embodiment of the plant light raising and lowering apparatus according to the present invention. As FIG. 10 shows, the second embodiment of the plant light raising and lowering apparatus 1 comprises two sets of supporting rods ad two rope, i.e., a first supporting rod SPR, a second supporting rod SPL, a first rope FSR, and a second rope SSR. In which, the first rope FSR and the second rope SSR are connected between the rope winch assembly 18 in the second accommodating unit PA2 and the base 10.

The above description is made on embodiments of the present invention. However, the embodiments are not intended to limit scope of the present invention, and all equivalent implementations or alterations within the spirit of the present invention still fall within the scope of the present invention.

What is claimed is:
1. A plant light raising and lowering apparatus, comprising:
   a frame assembly;
   a first accommodating unit, being disposed on the frame assembly, and accommodating with a lower-end pivoting module;
   a second accommodating unit, being fixed at a position that is over the first accommodating unit, and accommodating with an upper-end pivoting module;

a telescopic frame, being connected between the upper-end pivoting module and the lower-end pivoting module;
a plurality of light source carrying bases, being connected to the frame assembly, and each of the plurality of light source carrying base carrying with a light source;
a rope winch assembly, comprising a motor and a rope winch, wherein the motor is configured for driving the rope winch to wind/unwind at least one rope that is connected to the frame assembly; and
a control module, being coupled to the motor, and being provided with a counter unit and an inching movement recording unit therein;
wherein the control module is configured for controlling a rotary shaft of the motor to complete at least one time of a first-direction inching rotation and/or at least one time of a second-direction inching rotation, so as to drive the rope winch to wind or unwind the rope, such that the frame assembly is driven by the rope so as to finish an upward inching movement or a downward inching movement;
wherein the telescopic frame correspondingly complete a compression travel or an extension travel during the upward inching movement or the downward inching movement;
wherein the counter unit is adopted for counting at least one occurrence time and a total number of times of the first-direction inching rotation and the second-direction inching rotation, and the inching movement recording unit being configured for recording an amount of moving distance of the upward inching movement and the downward inching movement;
wherein the control module controls the motor to drive the rope winch to wind and/or unwind the rope according to the amount of moving distance recorded by the inching movement recording unit, thereby making the frame assembly achieve a one-time movement so as to reach a specific position.

2. The plant light raising and lowering apparatus of claim 1, wherein the specific position is selected from the group consisting of original position, user-setting position, and previously-staying position.

3. The plant light raising and lowering apparatus of claim 1, wherein the frame assembly comprises:
a first supporting rod;
a second supporting rod, being parallel to the first supporting rod; and
a base, being connected between one side of the first supporting rod and one side of the second supporting rod, and being adopted for supporting the first accommodating unit.

4. The plant light raising and lowering apparatus of claim 1, further comprising a plurality of connection units that are adopted for connecting the plurality of light source carrying bases to the frame assembly; wherein each of the plurality of connection units comprises:
a first connection member, being disposed on the frame assembly; and
a second connection member, being connected between the first connection member and one of the plurality of light source carrying bases.

5. The plant light raising and lowering apparatus of claim 1, wherein the telescopic frame comprises:
at least one two lower suspension arms, wherein both the two lower suspension arms are connected to the lower-end pivoting module 11 by one end thereof; and at least two upper suspension arms, wherein both the two upper suspension arms are connected to the upper-end pivoting module by one end thereof, and the respective upper suspension arms being connected with the respective lower suspension arms through a pivotal connection unit.

6. The plant light raising and lowering apparatus of claim 3, wherein a first supporting post and a second supporting post are vertically disposed on the first supporting rod and the second supporting rod, respectively.

7. The plant light raising and lowering apparatus of claim 1, further comprising:
at least one successive-detection distance sensing unit, being attached to the light source carrying base, and also being coupled to the control module, thereby being controlled to detect an illumination distance between the light source carrying base and at least one plant that is cultivated in a planting nursery; and
a light sensing module, comprising:
a light emitting unit, being attached on the first supporting rod or the second supporting rod; and
a light receiving unit, being attached on the second supporting rod or the first supporting rod, so as to remotely opposite to the light emitting unit.

8. The plant light raising and lowering apparatus of claim 6, further comprising:
a plurality of first stay cables, wherein each of the first stay cables is connected between the first supporting rod and the first supporting post; and
a plurality of second stay cables, wherein each of the second stay cables is connected between the second supporting rod and the second supporting post.

9. The plant light raising and lowering apparatus of claim 8, wherein a first cord fastener and a second cord fastener are disposed at two ends of each the first stay cables as well as two ends of each the second stay cables.

10. The plant light raising and lowering apparatus of claim 9, further comprising:
a plurality of first cable connecting members, being disposed on the first supporting rod and the second supporting rod, wherein each the cable connecting member has a connection portion for connecting the first cord fastener; and
a plurality of second cable connecting members, being disposed on the first supporting rod and the second supporting rod, and being adopted for connecting the second cord fastener.

11. The plant light raising and lowering apparatus of claim 8, further comprising:
a plurality of cable tensioners, being connected to the plurality of first stay cables and the plurality of second stay cables, and being used for adjusting a first cable tension of each the first stay cable and a second cable tension of each the second stay cable.

12. The plant light raising and lowering apparatus of claim 1, wherein the first supporting rod, the second supporting rod and the base are all telescopic.

13. The plant light raising and lowering apparatus of claim 7, further comprising:
a sensor unit, being coupled to the control module, and being configured for detecting a rotor position of the motor and/or a rotor speed of the motor, such that the counter unit of the control module is able to count the occurrence time and the total number of times of the first-direction inching rotation and the second-direction inching rotation.

14. The plant light raising and lowering apparatus of claim 13, wherein the sensor unit comprises a photo-interrupter and a disk with a plurality of black bars.

15. The plant light raising and lowering apparatus of claim 13, wherein the sensor unit is hall sensor.

16. The plant light raising and lowering apparatus of claim 13, wherein the control module further comprises:
- a micro controller, being coupled to the counter unit and the inching movement recording unit, the sensor unit, the light emitting unit, the light receiving unit, and the successive-detection distance sensing unit;
- a motor driver, being coupled to the micro controller, and being electrically connected to the motor;
- a light source driver, being coupled micro controller, and being electrically connected to the plurality of light sources; and
- a human machine interface (HMI), being coupled to the micro controller, and comprises a keyboard and display screen.

17. The plant light raising and lowering apparatus of claim 16, wherein the keyboard comprises an upward inching motion button, a downward inching motion button, an initial position return button, a user-set motion button, and a go-back motion button.

* * * * *